United States Patent
Ozawa et al.

[11] Patent Number: 6,080,104
[45] Date of Patent: *Jun. 27, 2000

[54] ELECTRONIC ENDOSCOPE SYSTEM

[75] Inventors: Ryo Ozawa; Kohei Iketani, both of Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/645,269

[22] Filed: May 13, 1996

[30] Foreign Application Priority Data

| May 16, 1995 | [JP] | Japan | 7-116801 |
| May 16, 1995 | [JP] | Japan | 7-116802 |
| May 18, 1995 | [JP] | Japan | 7-119615 |

[51] Int. Cl.$^7$ .............................. H04N 7/18; A61B 1/04
[52] U.S. Cl. .......................... 600/180; 600/181; 348/69
[58] Field of Search .................... 600/178, 180, 600/109, 160; 348/68, 69, 65, 70, 71, 921, 453; 358/520

[56] References Cited

U.S. PATENT DOCUMENTS

| 4,021,663 | 5/1977 | Takahashi . | |
| 4,086,583 | 4/1978 | Takahashi . | |
| 4,322,129 | 3/1982 | Takahashi et al. . | |
| 4,366,529 | 12/1982 | Takahashi et al. . | |
| 4,805,016 | 2/1989 | Kato | 348/71 |
| 4,868,645 | 9/1989 | Kobayashi | 348/69 |
| 4,894,715 | 1/1990 | Uchikbo | 348/65 |
| 4,967,269 | 10/1990 | Sassagawa et al. . | |
| 5,131,381 | 7/1992 | Ams | 348/69 |
| 5,159,380 | 10/1992 | Furuya et al. . | |
| 5,184,159 | 2/1993 | Furuya et al. . | |
| 5,184,170 | 2/1993 | Takahashi et al. . | |
| 5,191,369 | 3/1993 | Furuya et al. . | |
| 5,237,403 | 8/1993 | Sugimoto | 600/180 |
| 5,257,100 | 10/1993 | Hattori | 600/109 |
| 5,272,497 | 12/1993 | Furuya et al. . | |
| 5,608,451 | 3/1997 | Konno | 348/69 |
| 5,658,238 | 8/1997 | Suzuki | 600/146 |

FOREIGN PATENT DOCUMENTS

| 6139341 | 5/1994 | Japan . |
| 6301884 | 10/1994 | Japan . |

*Primary Examiner*—Gene Mancene
*Assistant Examiner*—Ira Hatton
*Attorney, Agent, or Firm*—Greenblum & Bernstein, P.L.C.

[57] ABSTRACT

In an electronic endoscope system for detecting an image of an object using a CCD, a brightness signal is generated based on the output of the CCD, and a histogram processing is applied to the brightness signal. An aperture size for regulating the amount of light emitted to an object to be viewed is controlled in accordance with the calculation based on the histogram data.

22 Claims, 14 Drawing Sheets

ELECTRONIC ENDOSCOPE SYSTEM

BACKGROUND OF THE INVENTION

The present invention relates to an electronic endoscope system which detects an image of an object using an imaging device, processes the detected image, and outputs the processed image to a monitor for viewing.

In the conventional electronic endoscope system, an image of an object (such as an internal organ or tract of the human body) is formed by an optical system on an imaging device, such as a CCD. The imaging device outputs an electrical signal to a video processor. The video processor processes the signals and outputs a video signal to the monitor in order to display the image detected by the electronic endoscope system.

FIG. 1 shows a conventional electronic endoscope system having an endoscope insertion portion 50 and a video processor 60. The endoscope insertion portion 50 has an imaging device such as a CCD 51 for detecting an image of an object. Light from a light source 66, located in the video processor 60, is transmitted, through an aperture 67 and a fiber optic cable 52, towards the object to be viewed. A light transmitting area of the aperture 67 is adjusted (i.e., the size of the aperture is changed) by an aperture drive circuit 65.

The image of the object is formed by a lens 55 on the CCD 51. Then the CCD 51 outputs an image signal to a first signal processing device 61 of the video processor 60. The image signal is processed and then transmitted to a second signal processing device 62, which converts the processed image signal to a video signal such as the NTSC signal that is then displayed on the monitor 80.

The processed image signal output from the first signal processing device 61 is also transmitted to one of a peak value detecting circuit 63 and an average value detecting circuit 64. An operator manually selects the peak value detecting circuit 63 or the average value detecting circuit 64 using an operation panel 69. A CPU 68 receives an operation signal from the operation panel 69 and operates switches 71 and 72 to select either the peak value detecting circuit 63 or the average value detecting circuit 64.

The aperture control circuit 65 controls the size of the aperture 67 in accordance with a signal output from the peak value detecting circuit 63 or the average value detecting circuit 64. Therefore, the size of the aperture is adjusted in accordance with the processed image signal, in order to maintain uniform average or peak brightness of the observed image.

However, with the electronic endoscope system described above, the operator must manually select the type of processing that will be performed on the image signal in order to control the size of the aperture 67. This reduces the efficiency of the electronic endoscope system and increases the burden on the operator as well as the patient who is being observed with the endoscope system.

Further, in the conventional electronic endoscope system, if there is a portion which is much brighter than the other portion within the observed area, the brightness of the brighter portion affects the average brightness of the observed area. In such a case, the aperture may be closed greater than necessary, and the other portions may not be observed because sufficient light is not received from such an area even if the average brightness has been unchanged.

Still further, even if the amount of light emitted from the fiber optic cable is the same, the average brightness of the observed area changes depending on the type of the CCD, magnification of the image, and the like.

Further, if the video processor 60 of the electronic endoscope system is designed to be used with a monitor of a TV system, such as NTSC, having a certain frame rate, and it is then used with a monitor of another TV system, such as PAL, having a different frame rate, it is necessary to change circuits. For example, a capacitor which controls a time constant of the peak value detecting circuit 63 and the average value detecting circuit 64 must be exchanged with a capacitor having different characteristics which are appropriate for the other system. Therefore, the size of the circuit must be increased to accommodate the extra capacitor, if the adaptability of the electronic endoscope system to operate with different monitors is required.

SUMMARY OF THE INVENTION

It is therefore an object of the present invention to provide an improved electronic endoscope system in which brightness on the monitor is adjusted appropriately.

It is another object of the present invention to provide an improved electronic endoscope system in which a frame rate of the video signal can be easily adjusted, and the circuitry of the electronic endoscope system can be reduced in size.

For the above object, according to the invention, there is provided an electronic endoscope system for detecting an image of an object using an imaging device, which comprises means for illuminating the object, means for obtaining image data of the object, means for generating brightness data based on the image data, means for applying histogram processing to the brightness data, and means for controlling amount of light emitted by the illuminating means to change in accordance with the result of the histogram processing.

Based on the output data of the histogram processing means, the size of the aperture can be controlled appropriately in various ways without any requirement for an extra circuit such as an average detecting circuit, a peak detecting circuit, or the like.

The illuminating means may include a light source, a fiber optic cable for transmitting light from the light source towards the object to illuminate the object, and an aperture means provided between the light source and the fiber optic cable. The controlling means changes the aperture size of the aperture means in order to change the amount of light admitted. Thus, the amount of light can be changed easily. Any alternative can be employed. For example, instead of changing the aperture size, a plurality of filtering members having different transparency can be placed to regulate the amount of light.

The electronic endoscope system further has means for displaying an image of the object, and display controlling means for controlling the image data such that an image corresponding to a part of the image data is displayed on the displaying means. The applying means applies the histogram processing only to the part of the image data which is displayed in the displaying means.

Since the data only necessary to be processed is processed, the efficiency is increased, which improves the process speed.

The electronic endoscope system further comprises means for converting the brightness data based on the result of the histogram processing. The controlling means controls the illuminating means to change the brightness of said object in accordance with the converted brightness data.

Since the brightness data is converted in accordance with the result of the histogram processing, dynamic range and/or contrast of the image displayed is improved. When the detected data consists of the RGB data, it is possible to generate the brightness data and color difference data therefrom. If the ROB data is restored after the brightness data is converted to represent an improved image with use of the color difference data, the improved RGB data can be obtained, which improves the quality of the displayed image.

DESCRIPTION OF THE PREFERRED EMBODIMENTS

Figure 1:
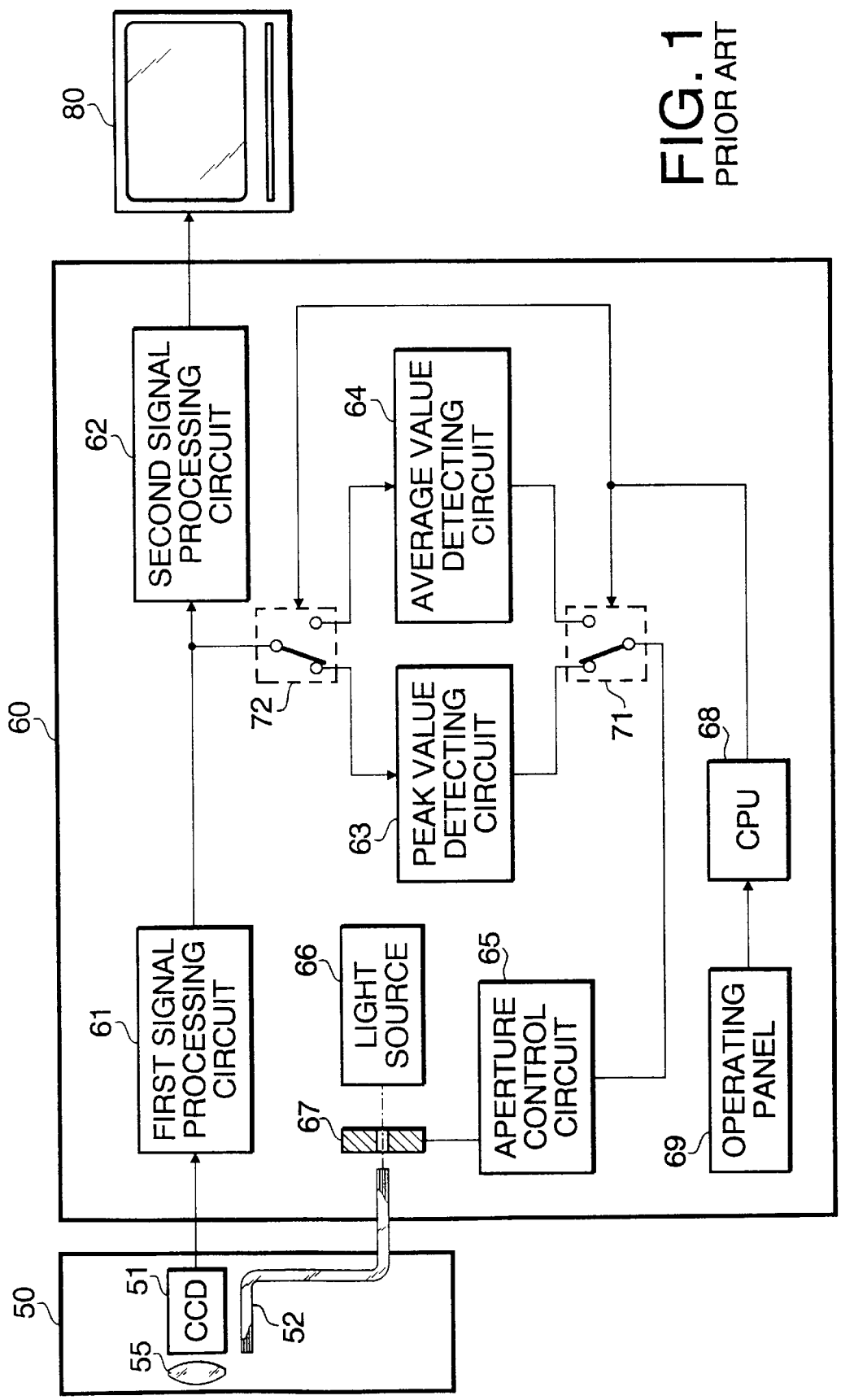
FIG. 1 shows a block diagram of a conventional electronic endoscope system.
Figure 2:
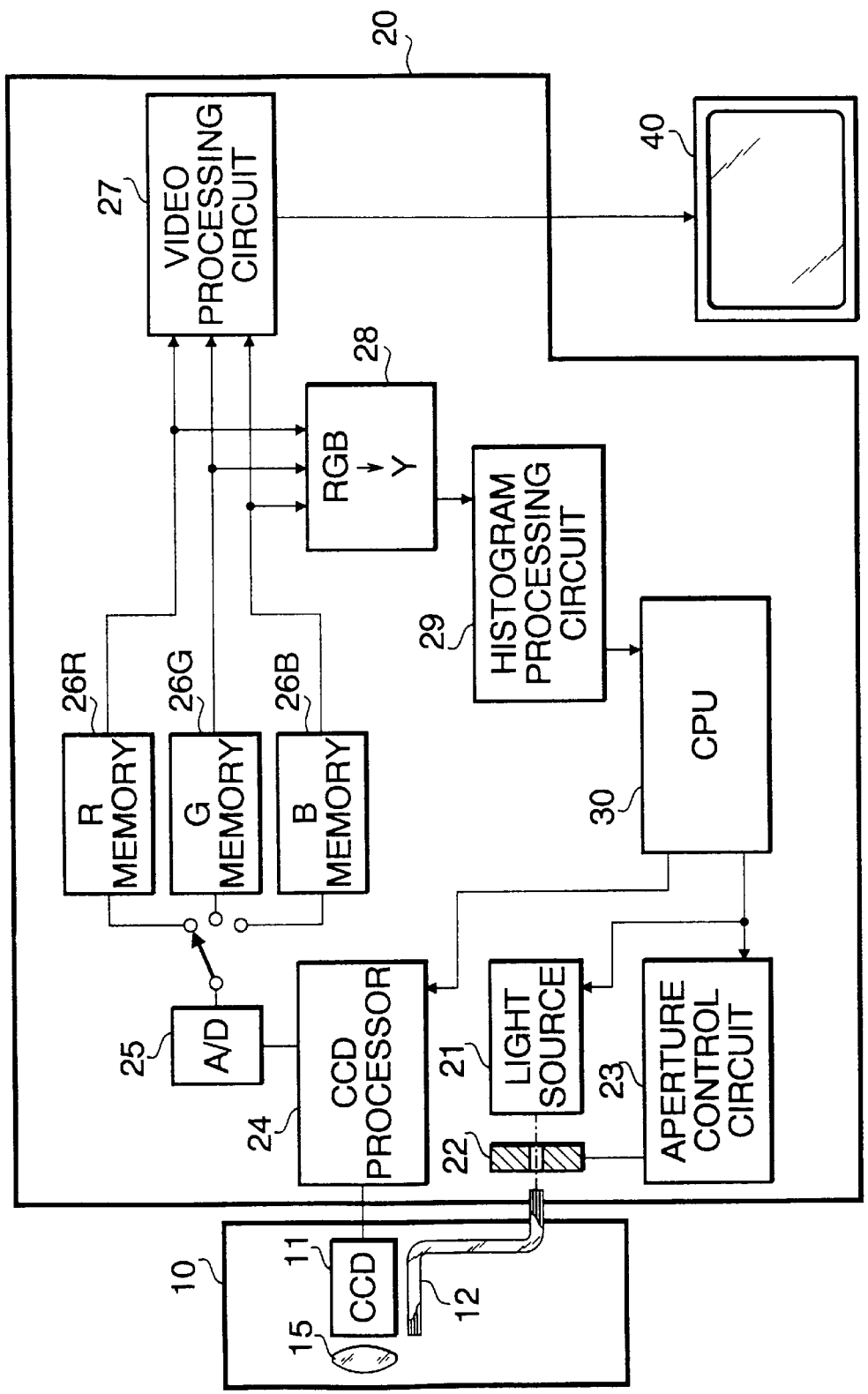
FIG. 2 shows a block diagram of a first embodiment of an electronic endoscope system according to the present invention.

FIG. 2 shows a block diagram of a first embodiment of an electronic endoscope system according to the present invention. The electronic endoscope system has an electronic endoscope insertion portion 10 and a video processor 20. The endoscope insertion portion 10 has an imaging device such as a CCD 11 for detecting an image of an object. Light from a light source 21, located in the video processor 20, is transmitted, through an aperture 22 and a fiber optic cable 12, towards the object to be viewed. A light transmitting area (i.e., the aperture size) of the aperture 22 is adjusted by an aperture drive circuit 23.

An image of the object to be viewed is formed on the CCD by an optical system 15. The CCD 11 then outputs an image signal to a CCD processing circuit 24 which converts the image signal to an analog video signal. The analog video signal is then converted to digital video data by the A/D converter 25. The light source sequentially emits Red, Green and Blue light with use of a filter mechanism, not shown, in order, and the CPU 30 controls the A/D circuit 25 to output the correct color information to respective memories 26R, 26G and 26B, in turn synchronously with change of colors of light.

After the digital video data corresponding to one frame has been stored in the three memories 26R, 26G and 26B, the digital video data is read out of the three memories 26R, 26G and 26B simultaneously and input to a video processing circuit 27. The video processing circuit 27 processes the digital video data and outputs an analog RGB signal to a monitor 40. Further, the digital video data is also transmitted to a brightness signal generating circuit 28 which generates a brightness signal Y based on the Red, Green and Blue components of the digital video data. The brightness signal Y is input to a histogram processing circuit 29 which process the brightness signal Y in order to provide input data to the CPU 30.

Figure 3:
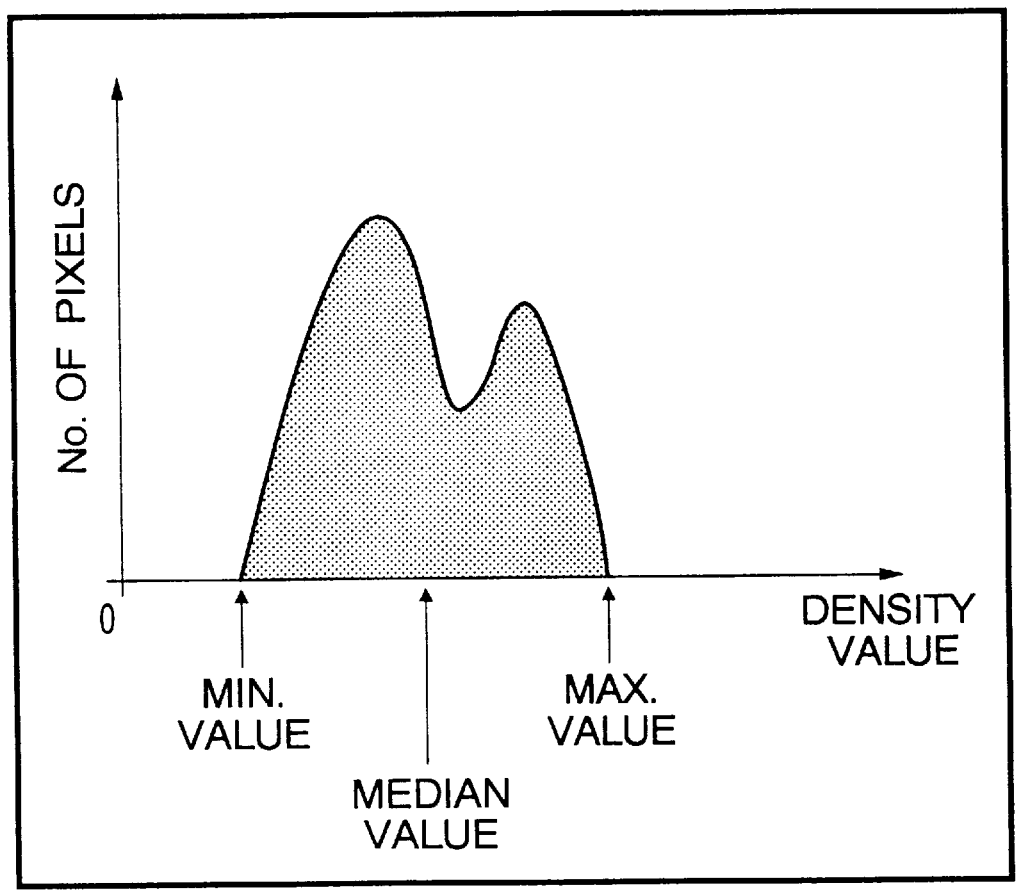
FIG. 3 is an example of a histogram showing a relationship between the density value and the number of pixels of an image observed in the electronic endoscope system.

The CPU 30 uses the data output from the histogram processing circuit 29 in order to calculate the minimum brightness value, the mean brightness value, the median brightness value and the maximum brightness value. FIG. 3 is an example of a histogram showing brightness distribution of an image detected by the CCD 11.

The CPU 30 further calculates the dispersion and standard deviation of the brightness signal Y using the data output from the histogram processing circuit 29. The equations used to calculate the mean (average), standard deviation and the dispersion of the brightness signal Y are as follows:

$$\text{Average} = \frac{\sum (Dval_N \times P_N)}{P_T}$$

$$\text{Standard Deviation} = \sqrt{\frac{\sum [(Dval_N - \text{average})^2 \times P_N]}{P_T}}$$

$$\text{Dispersion} = \frac{\sum [(Dval_N - \text{average})^2 \times P_N]}{P_T}$$

where $Dval_N$ is the density value, $P_N$ is the number of pixels having the density value $Dval_N$, and $P_T$ is the total number of pixels.

The CPU 30 outputs control signals to the aperture control circuit 23, the light source circuit 21, and the CCD processor 24, in order to control the amount of light transmitted by the light guide fiber cable 12 to illuminate the object, and to control the amount of amplification of the image signal processed by the CCD processor 24. This results in the brightness of the detected image and the quality of the observed image being maintained appropriately. The setting of the brightness value to be used for the above controls is accomplished by using an operation panel (not shown) of the video processor 20. For example, in the description below, a range of the brightness value is used. In such a case, the range is defined by using the operation panel. The brightness value range is defined as a range between the maximum and minimum values.

Figure 4:
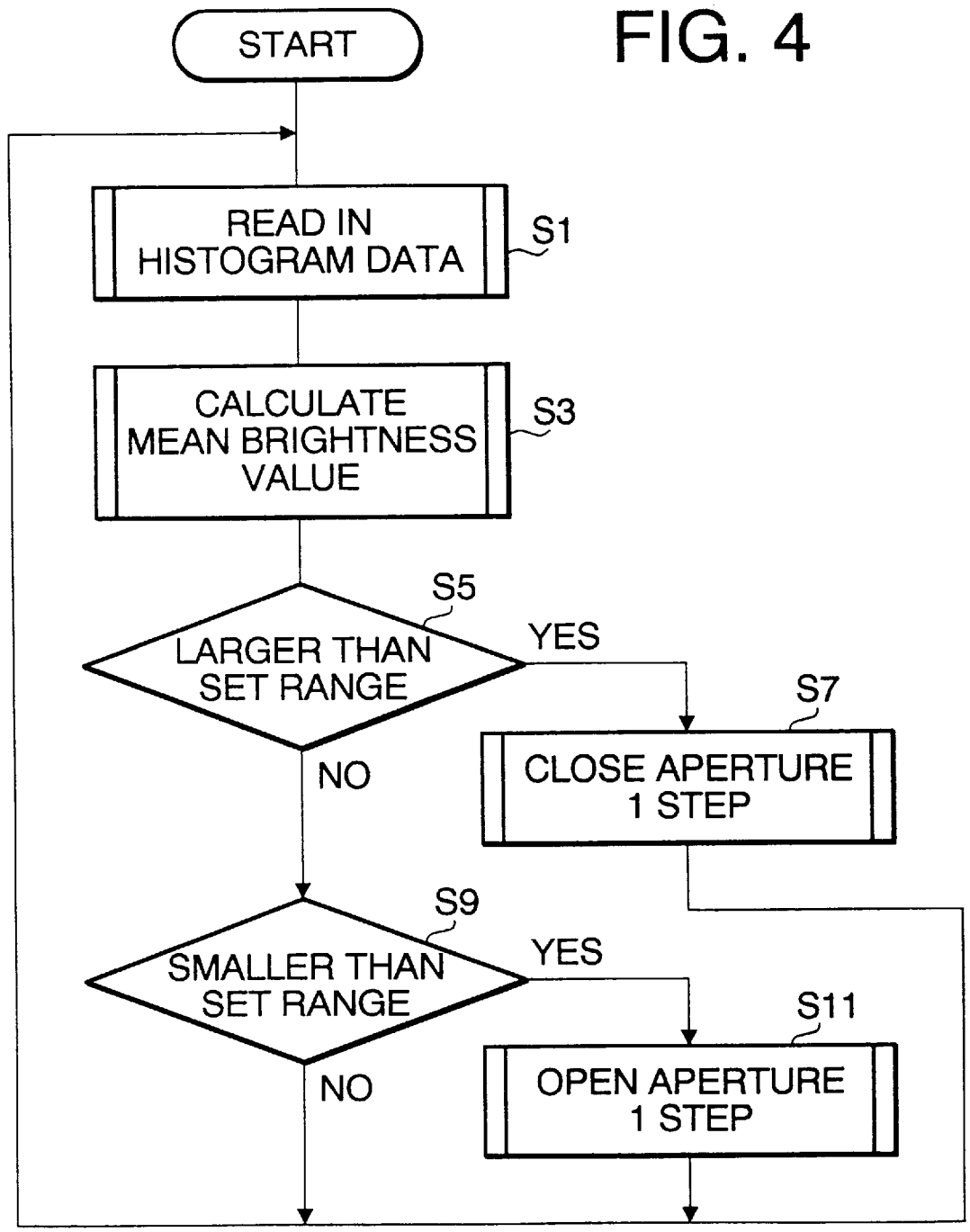
FIG. 4 shows a flow chart of an operation performed by a CPU of the electronic endoscope system.

FIG. 4 shows a flowchart of a control process performed by the CPU 30 when the aperture 22 is adjusted.

Initially, in step S1, the histogram data is read from the histogram processing circuit 29. Then the CPU 30 calculates the mean (average) brightness value using the processed data, in step S3. Step S5 determines whether the mean brightness value is larger than the maximum value of an allowed brightness range. If the mean brightness value is larger than the maximum value of the allowed brightness range (S5:YES) then the aperture is closed one step in step S7 in order to decrease the mean brightness value, and control returns to step S1.

However, if the mean brightness value is not larger than the maximum value of the allowed brightness range (S5:NO), then step S9 determines whether the mean brightness value is smaller than the minimum value of the allowed brightness range. If the mean brightness value is smaller than the minimum value of the allowed brightness range (S9:YES) then the aperture is opened one step in step S11 in order to increase the mean brightness value, and control returns to step S1. If the mean brightness value is within the allowed brightness range (S9:NO), then step S11 is not executed, therefore the aperture is not changed, and control returns to step S1.

As described above, the size of the aperture 22 is controlled in accordance with a mean brightness value of the image detected by the CCD 11. However, it is possible to control the size of the aperture 22 in accordance with a median brightness value, a maximum brightness value or a minimum brightness value. Since the size of the aperture 22 is controlled in accordance with the data processed by the histogram processing circuit 29, depending on the condition of the object to be observed and/or the type of the CCD 11, an appropriate one of the max brightness value, minimum brightness value, median brightness value, and mean brightness value can be used in order to control the aperture 22.

Figure 5:
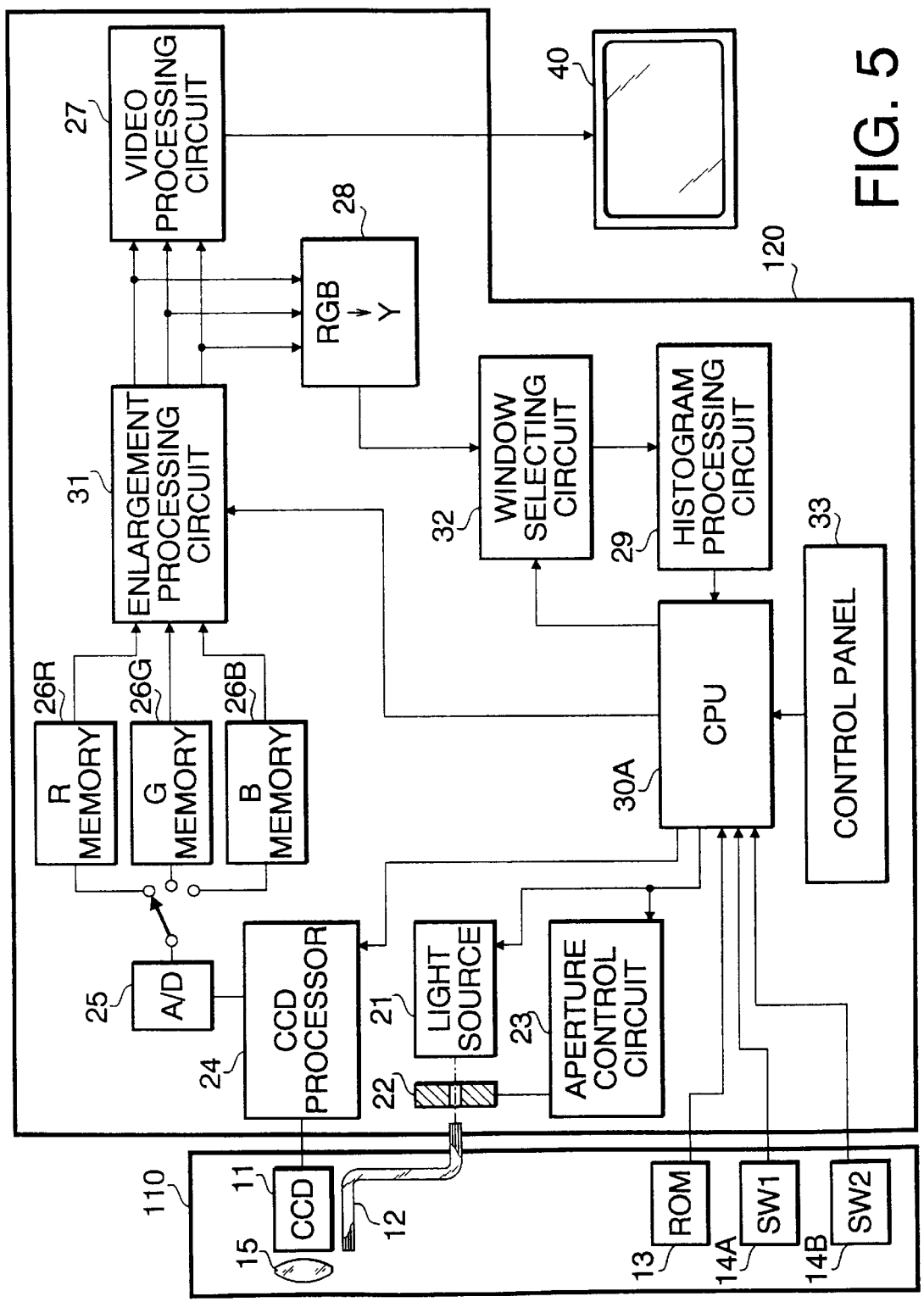
FIG. 5 shows a block diagram of an electronic endoscope system according to a second embodiment of the present invention.

FIG. 5 shows a block diagram of a second embodiment of the electronic endoscope system. The electronic endoscope system has an electronic endoscope insertion portion 110 and a video processor 120. The electronic endoscope insertion portion 110 is similar to the electronic endoscope insertion portion 10 described above in the first embodiment, but further includes a ROM 13 and a first and a second selecting switches 14A and 14B. The video processor 120 is similar to the video processor 20 described above in the first embodiment, but further includes an enlargement processing circuit 31, a window selecting circuit 32, and a control panel 33. Further, the CPU 30 of the first embodiment is replaced with a CPU 30A in the second embodiment.

Figure 6:
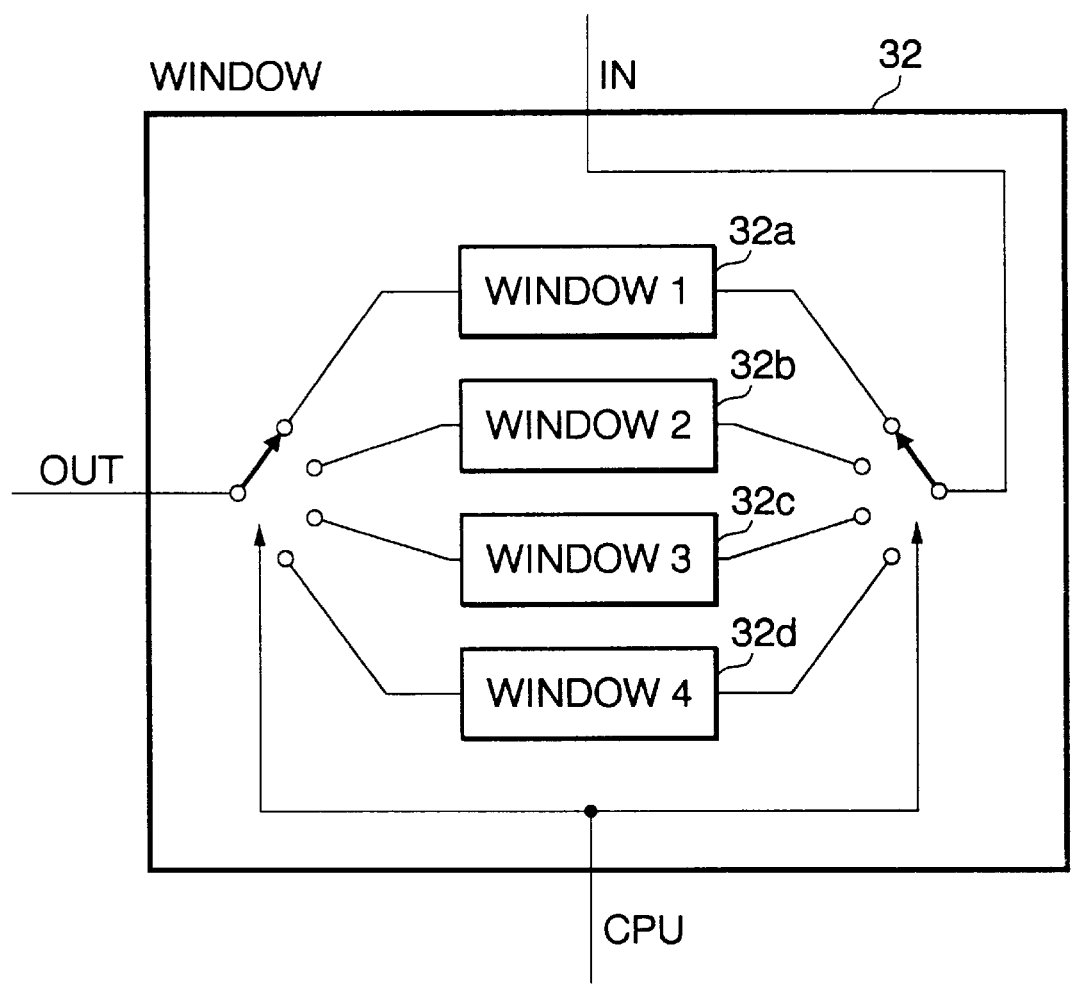
FIG. 6 shows a block diagram of a window selecting circuit shown in FIG. 5.

FIG. 6 shows a schematic block diagram of the window selecting circuit 32. AS shown in FIG. 6, the CPU 30A selects one of four data limiting circuits 32a through 32d corresponding to the four windows (WINDOW 1, WINDOW 2, WINDOW 3 and WINDOW 4), which will be described later, in accordance with a setting on the selecting switches 14A and 14B. The four data limiting circuits 32a through 32d are set to designate different data ranges as respectively shown in the four windows WINDOW1 through WINDOW4.

Figure 7A:
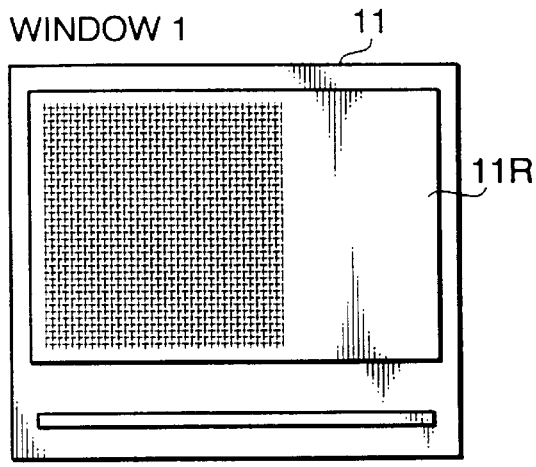
FIGS. 7A through 7D show examples of the windows that can be selected by the window selecting circuit shown in FIG. 6.
Figure 7B:
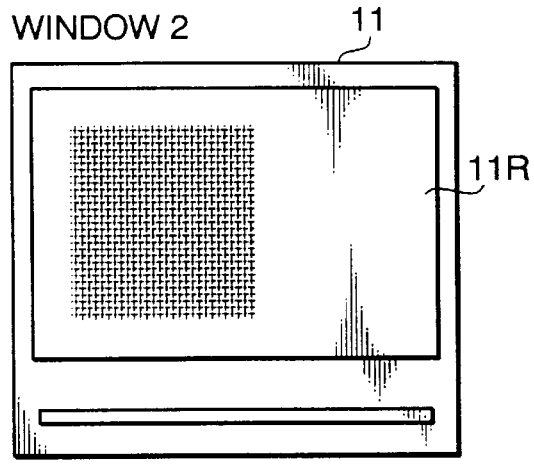
Figure 7C:
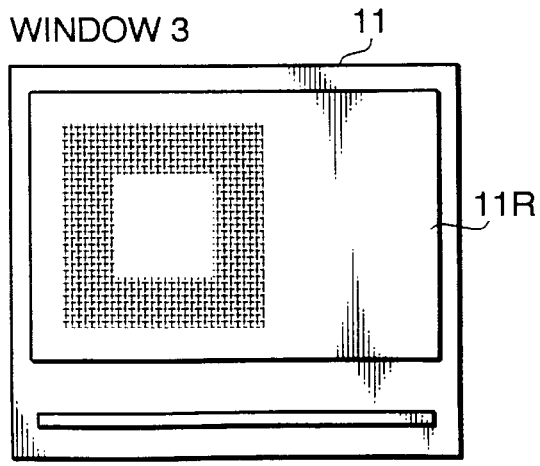
Figure 7D:
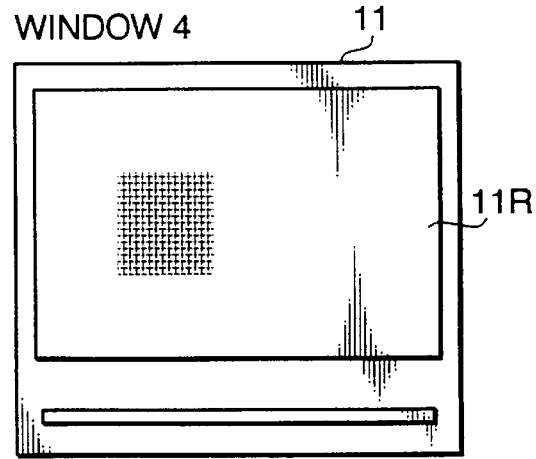

FIGS. 7A through 7D show examples of the four different windows WINDOW1 through WINDOW4 each of which is defined as an effective area of the object to be observed. In FIGS. 7A through 7D, the hatched portions represent areas of the light receiving surface 11R of the CCD 11. The operator of the endoscope cam select a desired area of the object only by selecting one of four windows shown in FIGS. 7A through 7D. Only the image corresponding to the selected portion of the light receiving area 11R is displayed on the monitor 40 as a full screen image. If the window WINDOW2 shown in FIG. 7B is selected, the selected area (i.e., the hatched area in the drawing) is displayed as magnified. If the window WINDOW2 is selected, the image displayed on the monitor 40 is magnified twice with respect to the original image (an image as displayed when the WINDOW1 is selected). If the window WINDOW3 shown in FIG. 7C is selected, the magnification of the image of the selected area of the object will be two, and the central area is made blank. If the window WINDOW4 shown in FIG. 7D is selected, the magnification of the displayed image of the selected area of the object will be four. When the operator selects one of the windows, the CPU 30A controls the enlargement processing circuit 31 to output data corresponding only to the selected area of the image data. The enlargement processing circuit 31 outputs the image data after processing the portion of the data in accordance with the magnification. As described above, each of the our windows allows different portions of the image to be displayed on the monitor 40. Therefore the operator can quickly select a portion of the image to be displayed on the monitor 40. Further, the histogram processing circuit 29 only receives the digital image data for the portion of the image that is displayed on the monitor 40, since the enlargement processing circuit 31 outputs only data corresponding to data to be displayed on the monitor 40.

Figure 8A:
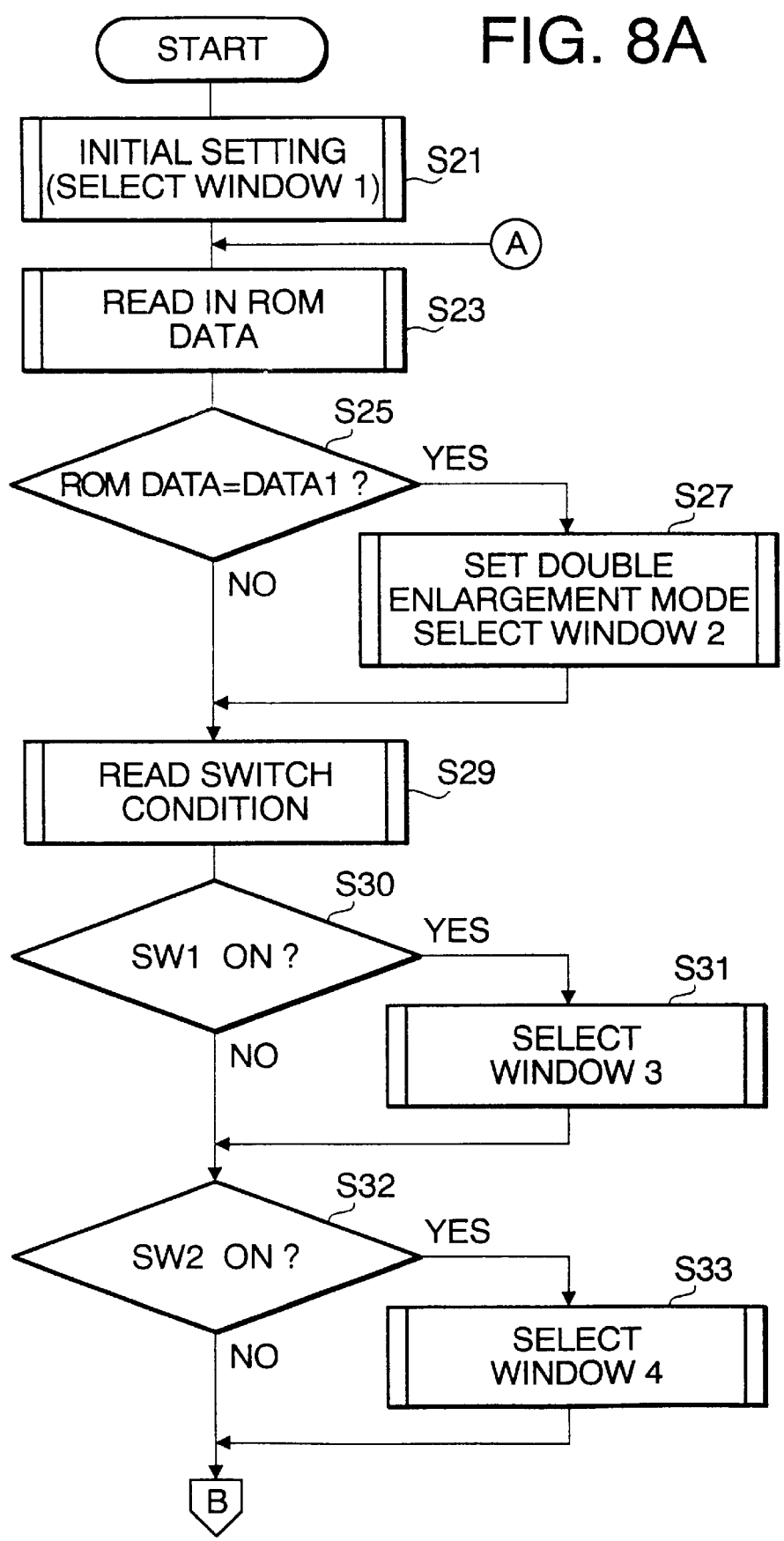
FIGS. 8A and 8B show a flow chart of an operation performed by a CPU of the electronic endoscope system according to a second embodiment of the present invention.
Figure 8B:
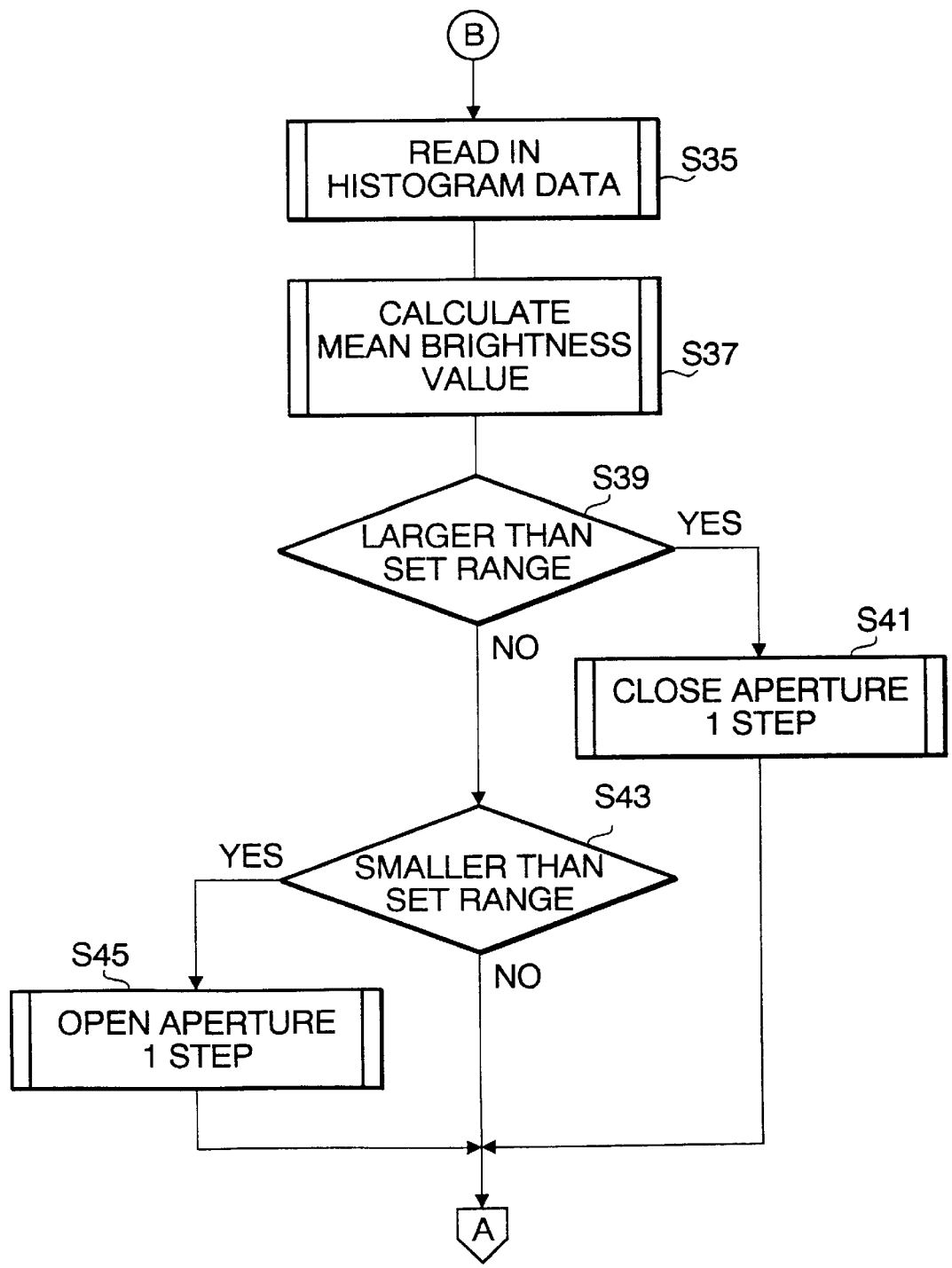

FIGS. 8A and 8B show a flowchart of control process performed by the CPU 30 according to the second embodiment of the present invention.

Step 321 performs the initialization of the electronic endoscope system such as the setting of the selection of one of the data limiting circuits 32a through 32d. In the second embodiment, the window WINDOW1 is selected as an initial setting, and therefore the data limiting circuit 32a is set in the initialization step S21. Then in step S23, the data stored in the ROM 13 is read out.

Step S25 determines whether the data read out of the ROM 13 is equivalent to a predetermined data DATA1.

If the data read out of the ROM 13 is equivalent to the predetermined data DATA1 (S25:YES), then step S27 is selects the window WINDOW2 and sets an enlargement ratio of the enlargement processing circuit 31 to two (i.e., a double enlargement mode). In this case, the CPU 30 controls the window selecting circuit 32 to select the second data limiting circuit 32b. Control then proceeds to step S29.

If the data read out of the ROM 13 is not equivalent to the predetermined data DATA1 (S25:NO), then step S27 is not executed.

Step S29 determines the setting of the switches 14 and 14B. Then step S30 determines whether the switch 14A is turned ON. If the switch 14A is turned ON (S30:YES), then CPU 30 selects the window WINDOW3 and controls the window selecting circuit 32 to select the third data limiting circuit 32c. Then step S32 determines whether the switch 14B is turned ON. Then control proceeds to stop S32. If the switch 14A is not turned ON, then step S31 is not executed and control proceeds to step S32. If the switch 14B is turned ON (S32:YES), then CPU 30 selects the window WINDOW4 and controls the window selecting circuit 32 to select the fourth data limiting circuit 32d (S33). Then control proceeds to step S35. If the switch 143 is not turned ON, then step S33 is not executed and control proceeds to step S35.

Then, in step S35, the histogram data is read from the histogram processing circuit 29. Then the CPU 30 calculates the mean brightness value using the histogram data, in stop S37. Step S39 determines whether the mean brightness value is larger than the maximum value of an allowed brightness range. If the mean brightness value is larger than the maximum value of the allowed brightness range (S39:YES) then the aperture is closed one step in step S41 and control returns to step S21.

However, if the mean brightness is not larger than the maximum value of the allowed brightness range (S39:NO), then step S43 determines whether the mean brightness value is smaller than the minimum value of the allowed brightness range. If the mean brightness value is smaller than the minimum value of the allowed brightness range (S43:YES) then the aperture is opened one step in step S45 and control returns to step S21. If the mean brightness value is within the allowed brightness range (S43:NO), then step S45 is not executed, and control returns to step S21.

Figure 9:
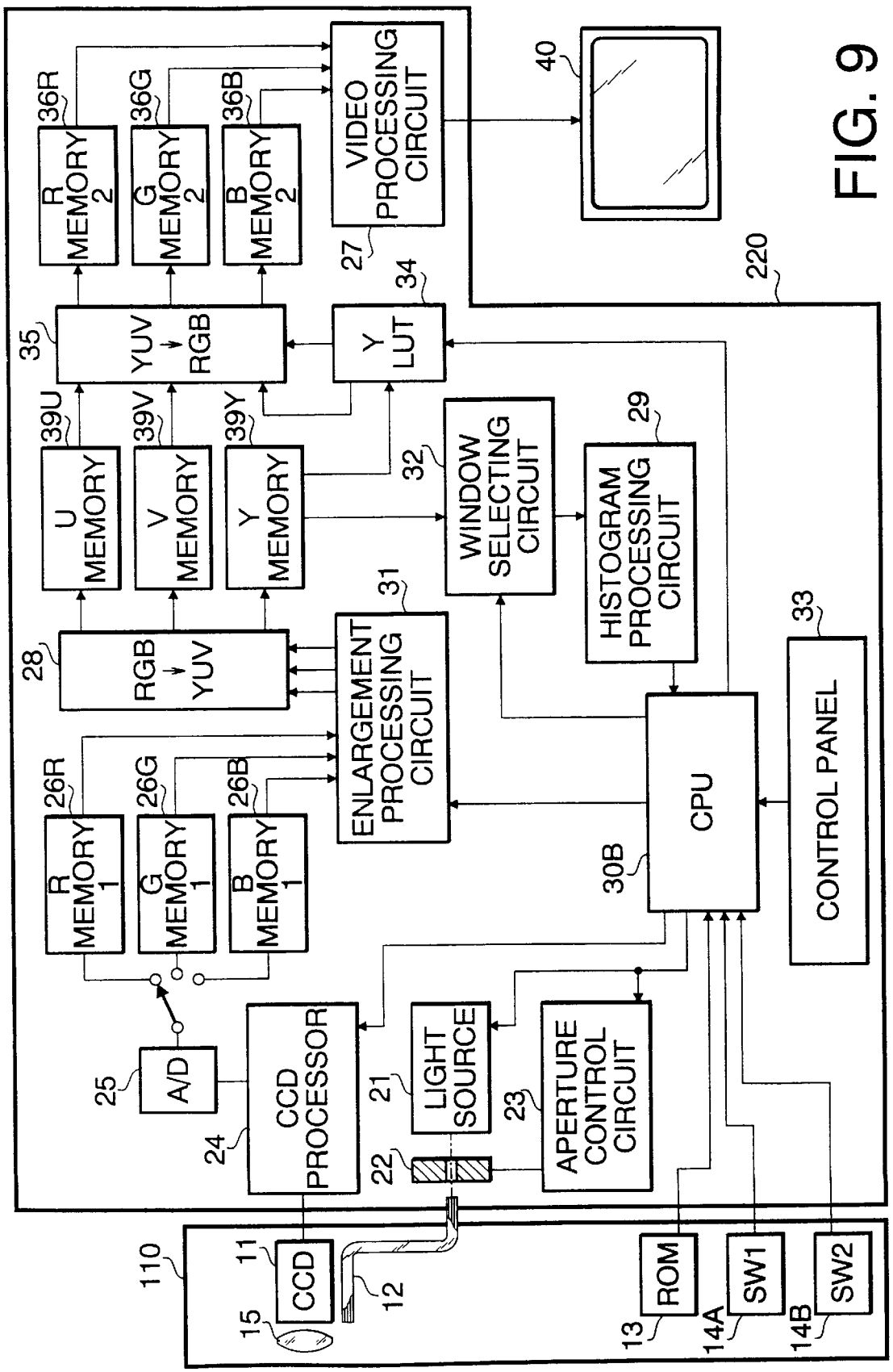
FIG. 9 shows a block diagram of an electronic endoscope system according to a third embodiment of the present invention.

FIG. 9 shows a block diagram of a third embodiment of the electronic endoscope system. The electronic endoscope system has the electronic endoscope insertion portion 110 and a video processor 220. The video processor 220 is similar to the video processor 120 described above in the second embodiment, but further includes a color signal converting unit 28, color signal memories 39U, 39V and 39Y, a brightness signal look up table 34, and a color restoration unit 35. The CPU 30A in the second embodiment is replaced with a CPU 30B in the third embodiment.

As shown in FIG. 9, the RGB signal output from the enlargement processing circuit 31, is converted to a pair of color difference signals U and V, and a brightness signal Y, by the color signal converting unit 28. The color difference signals U and V and the brightness signals Y, are then stored in memories 39U, 39V and 39Y, respectively.

The brightness signal Y stored in the memory 31Y is read out and transmitted to the window selecting circuit. 32, and the brightness look up table 34. The brightness look up table 34 uses the input value of the brightness signal Y and the histogram data obtained from the histogram processing circuit 29 and the CPU 30B to determine (as described later) an output brightness level.

The output brightness signal Y, and the color difference signals U and V stored in the memories 39U and 39V are input to the color restoration unit 35 to restore the RGB signal. The RGB signal is then separated into the component colors which are stored in turn in the frame memories 36R, 36G and 36B as R, G and B data. The R, G and B data is then simultaneously read out of the frame memories 36R, 36G and 363 and processed by the video processing circuit 27. The video processing circuit 27 then outputs a video signal to the monitor 40 in order to display the image detected by the electronic endoscope device.

In the third embodiment, the RGB image data is once converted into the brightness data Y, and the color difference data U and V. Then, the brightness data Y is processed with use of the histogram processing circuit 29, and the look up table 34 generated base on the histogram. The processed brightness data Y, and the color difference data U and V, the RGB data is restored. In the third embodiment, a gray scale transformation method is employed to process the brightness data Y.

Figure 10:
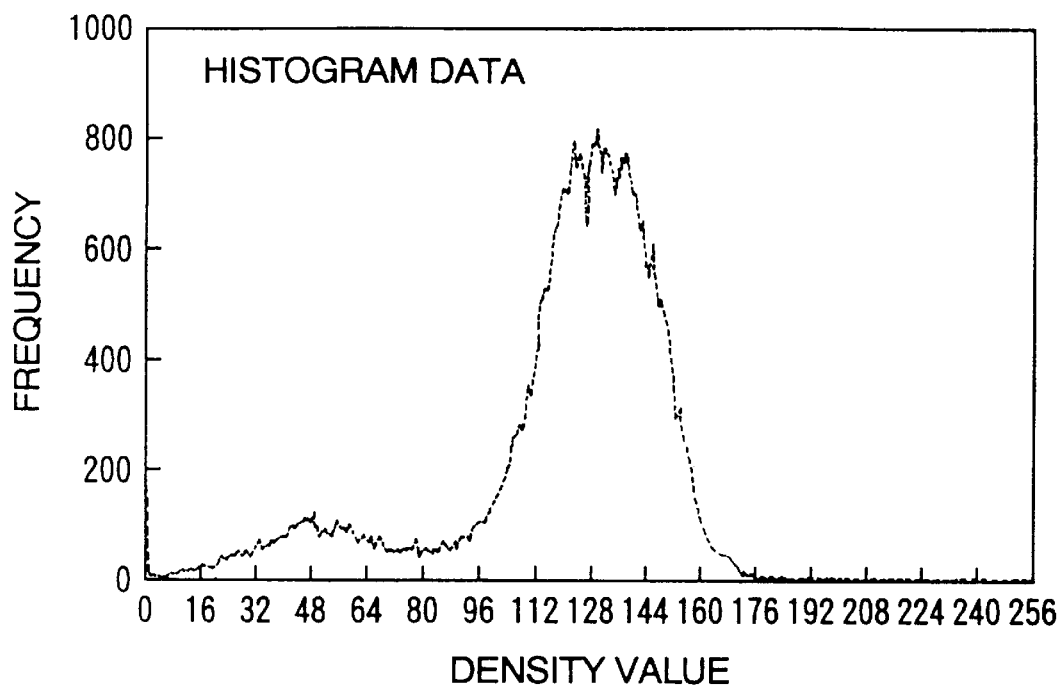
FIG. 10 is an example of a histogram showing a relationship between the density and the number of the pixels of an image observed in the electronic endoscope system.
Figure 11:
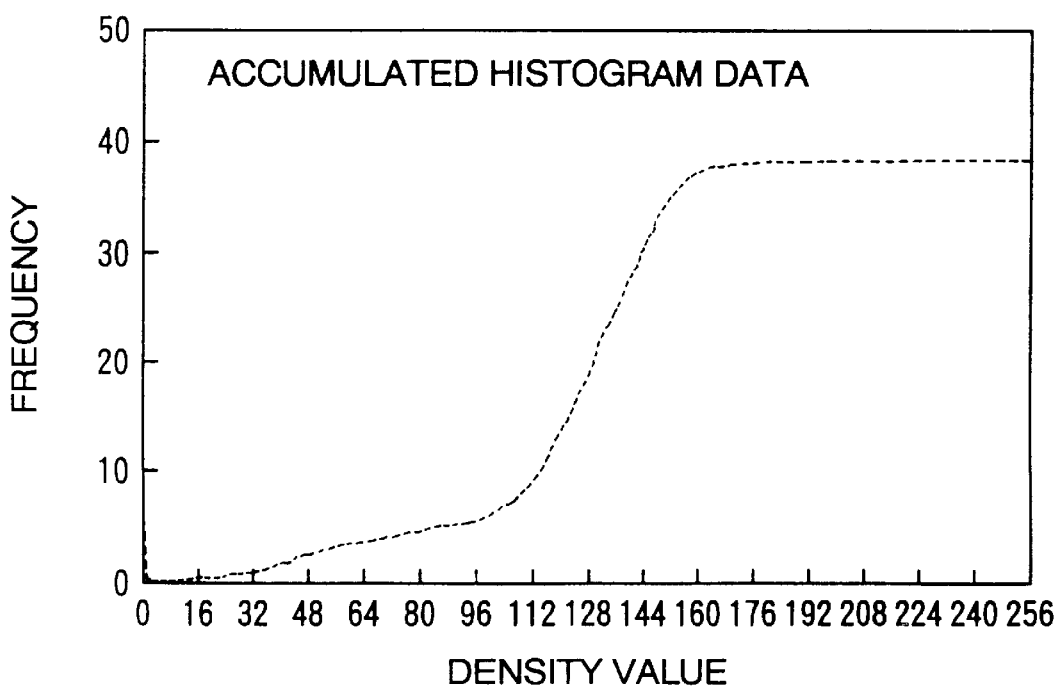
FIG. 11 is an accumulated histogram corresponding to histogram shown in FIG. 10.
Figure 12:
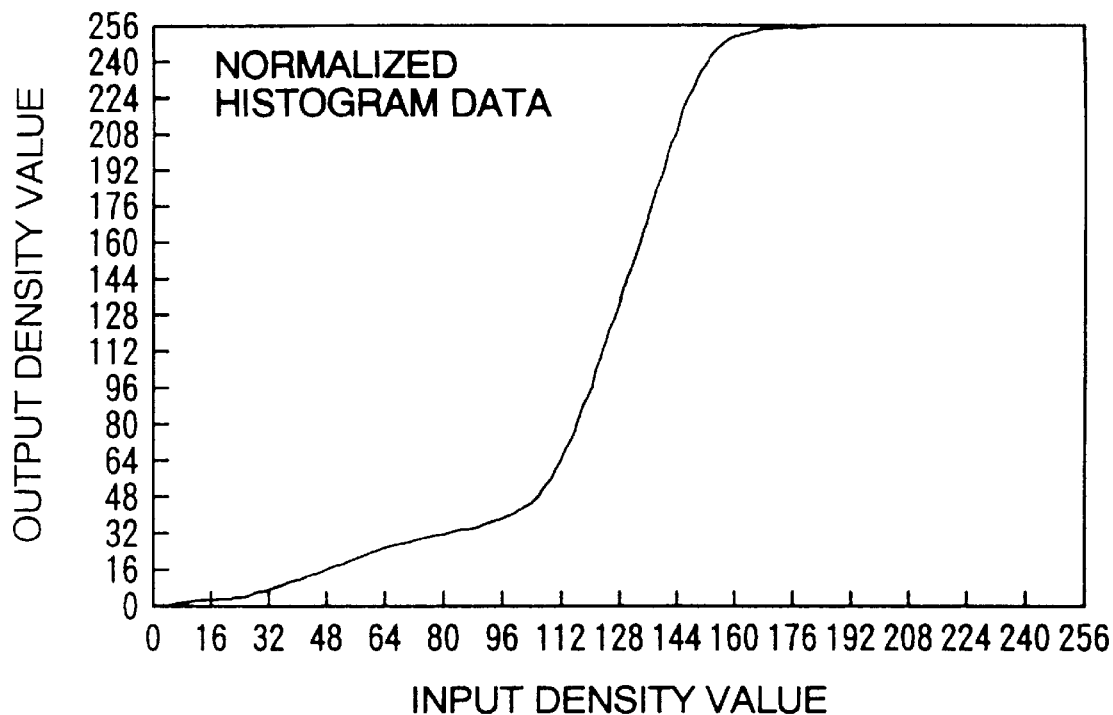
FIG. 12 is a normalized histogram corresponding to the histogram shown in FIG. 10.

FIGS. 10 through 12 show the original histogram, an accumulated histogram and a normalized accumulated histogram, respectively.

The actual data shown in FIG. 10 is output from the histogram processing circuit 29 and transmitted to the CPU 30. The CPU 30 calculate the accumulated data as shown in FIG. 11, and then obtains the normalized data, as shown in FIG. 12. The normalized histogram data can be used as a characteristic showing the relationship between input data and the output data. The process described above, i.e., obtaining the histogram, generating the accumulated histogram and generating the input/output characteristics, is employed when the gray scale transformation is preformed. If the brightness data Y is converted with use of the characteristic shown in FIG. 11, the dynamic range of the gradation, and/or the contrast of the image can be improved.

The relationship of the input and out put density values as shown in FIG. 12 is stored as look up table data in the look up table 34. If the actual brightness data is input to the look up table, the data, converted in accordance with the normalized histogram data, is output from the look up table 34. As described above, the output data of the look up table 34 is improved in terms of its dynamic range and contrast.

Figure 13:
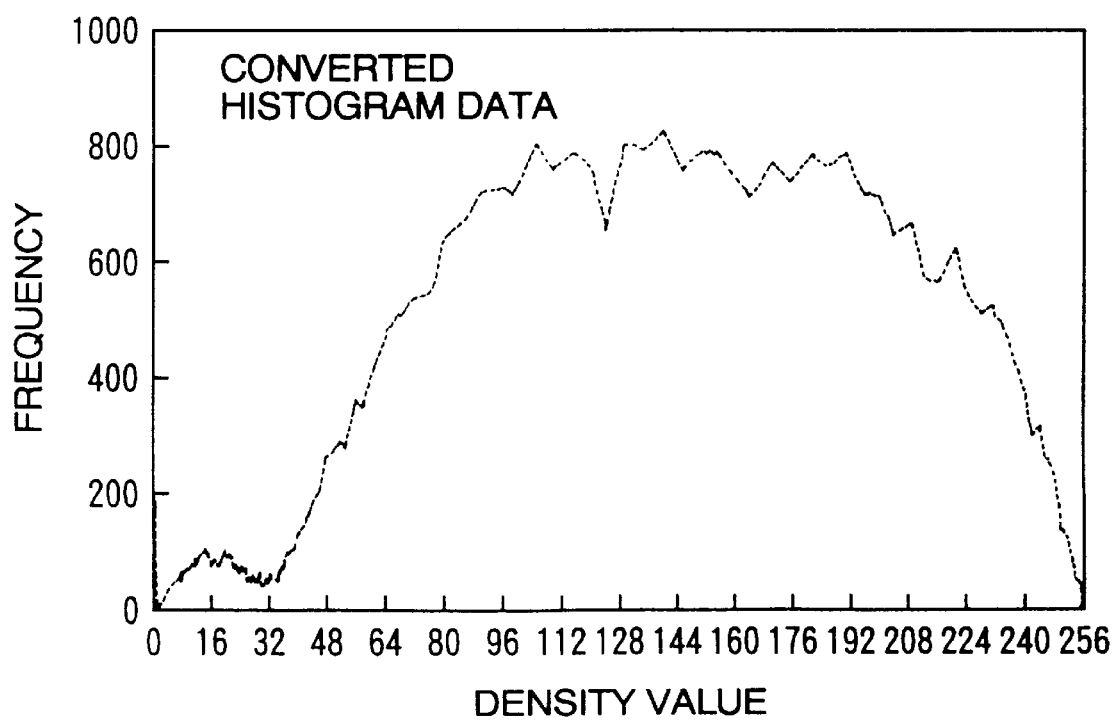
FIG. 13 is a converted histogram based on the normalized histogram shown in FIG. 12.

FIG. 13 shows the converted histogram data with the scale of the density range expanded compared with the scale of FIG. 10, i.e., the dynamic range was broadened. The brightness data Y as corrected by the look up table 34 and the color difference signals read from the memories 39U and 39V are input to the color restoration circuit 35 to restore the RGB signal. Since the brightness signal Y has been converted such that the quality of the image is improved, the restored RGB signal also has better quality than the originally obtained RGB signal (output of the R, G and B memories 26R, 260 and 26B). The restored RGB signal is then processed as described above. Note that the value written into the look up table 34 is not limited to a value which normalizes the accumulated histogram data, and any other transformation method for replacing current density value with another density value in order to expand the contrast and/or the dynamic range of the signal can be applied. It is possible to expand a portion of the histogram, to use a gamma compensation or the like. If the histogram equalization method is employed, flattening of the histogram can be performed, which improves the contrast of the image. Further, since the mean brightness value and dispersion can be calculated, a so-called normalization of gray scale can also be performed. If the gray scale is normalized, the density distribution depending on the image detecting condition cam be cancelled, and therefore it becomes possible to compare the density distributions between plural images. In the normalization of the gray scale method, the image data is converted such that the current mean value and the dispersion are replaced with another mean value and another dispersion.

Figure 14A:
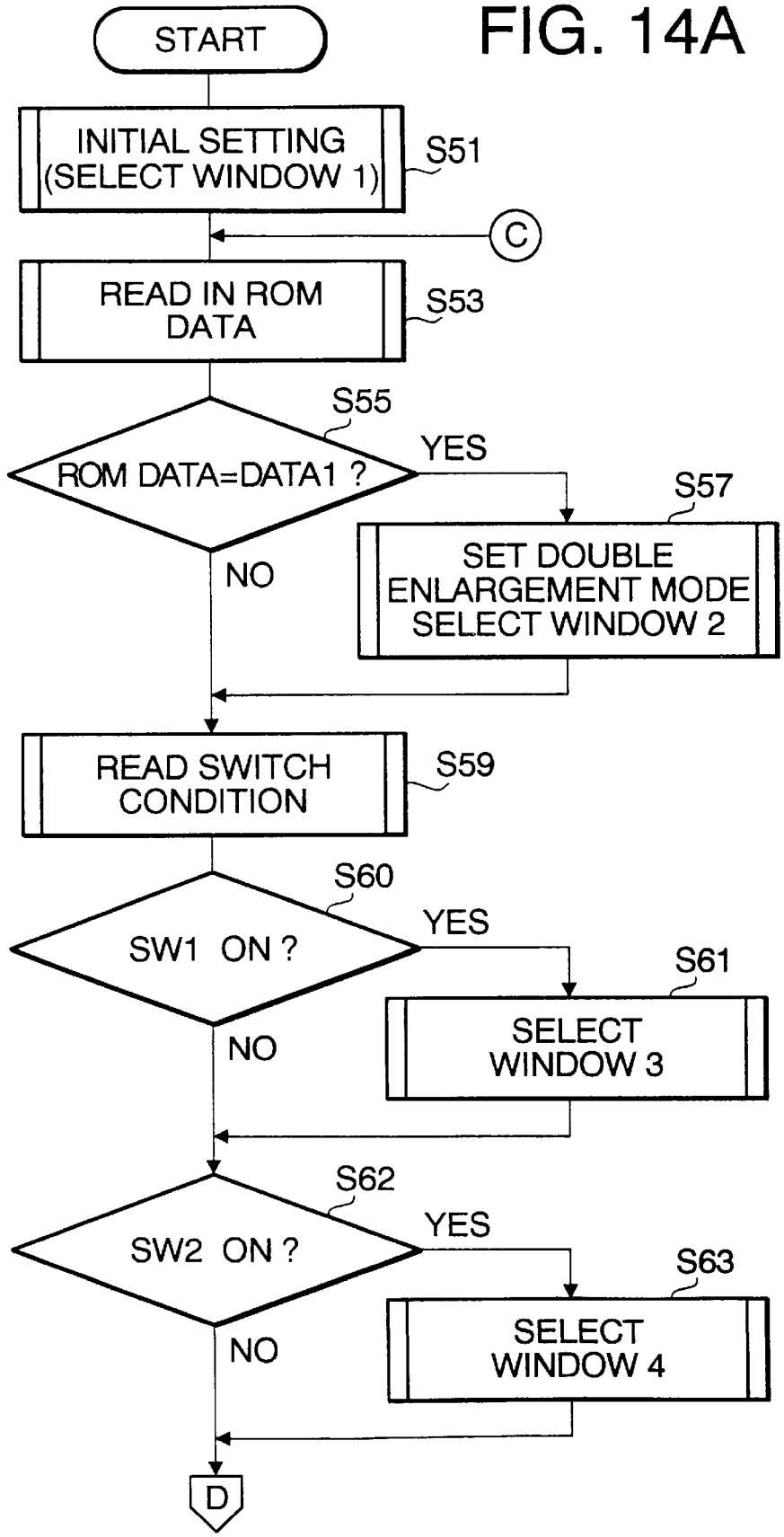
FIGS. 14A and 14B show a flow chart of an operation performed by a CPU of the electronic endoscope system according to a third embodiment of the present invention.
Figure 14B:
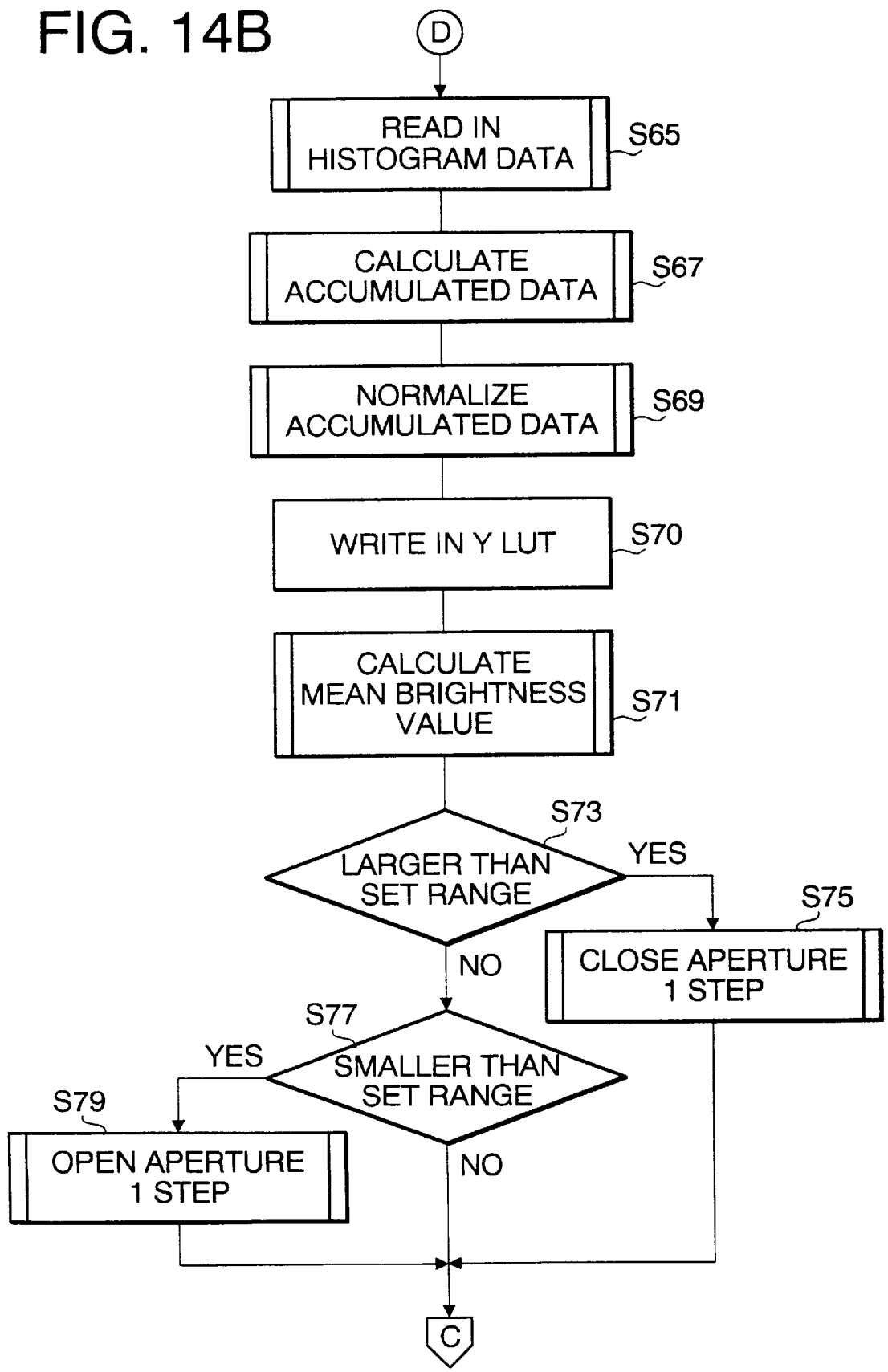

FIGS. 14A and 14B show a flowchart of the control process performed by the CPU 30 in the third embodiment. The flowchart shown in FIGS. 14A and 14B is similar to the flowchart shown in FIGS. 8A and 8B except that the flowchart shown in FIGS. 14A and 143 has additional steps of S67, S69 and S70.

Thus, step S51 performs the initialization of the electronic endoscope system as described above in the second embodiment. Then in step S53, the data stored in the ROM 13 is read out. The window WINDOW1 is selected in the initialization step S51.

Step S55 determines whether the data read out of the ROM 13 is equivalent to the predetermined data DATA1.

If the data read out of the ROM 13 is equivalent to the predetermined data DATA1 (S55:YES), then step S57 sets the enlargement ratio of the enlargement processing circuit 31 to two, and the WINDOW2 is selected. Control then proceeds to step S59.

If the data read out of the ROM 13 is not equivalent to the predetermined data DATA1 (S55:NO) then step S57 is not executed.

Step S59 determines the setting of the switches 14A and 14B. Then step S60 determines whether the switch 14A is turned ON. If the switch 14A is turned ON (S60:YES), then the CPU 30 controls the window selecting circuit 32 to select the third data limiting circuit 32c and therefore WINDOW3 (S61). Then control proceeds to step S62. If the switch 14A is not turned ON, then step S61 is not executed and control proceeds to S62. Then step S62 determines whether the switch 14B is turned ON. If the switch 14B is turned ON (S62:YES), then the CPU 30 controls the window selecting circuit 32 to select the fourth data limiting circuit 32d and therefore WINDOW4 (S63). Then control proceeds to step S65. If the switch 14B is not turned ON, then step 363 is not executed and control proceeds to step S65.

Then, in stop S65, the histogram data is read from the histogram processing circuit 29. The accumulated data is calculated in step 367, and then normalized in step S69. In step S70, the normalized histogram data is stored in the look up table 34.

Then the CPU 30 calculates the mean brightness value using the histogram data, in step S71. Step S73 determines whether the mean brightness value is larger than the maximum value of an allowed brightness range. If the mean brightness value is larger than the maximum value of the allowed brightness range (S73:YES) then the aperture is closed one step in step S75 and control returns to step S51.

However, if the mean brightness is not larger than the maximum value of the allowed brightness range (S73:NO), then step S77 determines whether the mean brightness value is smaller than the minimum value of the allowed brightness range. If the mean brightness value is smaller than the minimum value of the allowed brightness range (S77:YES) then the aperture is opened one step in step S79 and control returns to step S51. If the mean brightness value is within the allowed brightness range (S77:NO), then step S79 is not executed, and control returns to step S51.

As described above, the brightness signal data of the picture image signal obtained by the imaging device is processed using the histogram processing circuit 29, and the brightness of the image signal is corrected in response to the lock up table which is generated based on the histogram data. Therefore, the observed image can have improved contrast an dynamic range. Further, the size of the circuit required is small, and therefore, the overall size and cost of manufacturing of the electronic endoscope device is reduced.

The present disclosure relates to subject matter contained in Japanese Patent Application No. HEI 7-116801 filed on May 16, 1995, Japanese Patent Application No. HEI 7-116802 filed on May 16, 1995, and Japanese Patent Application No. HEI 7-119615 filed on May 18, 1995 which are expressly incorporated herein by reference in their entireties.

What is claimed is:

1. An electronic endoscope system for detecting an image of an object using an imaging device, comprising:
   a light source that emits light to illuminate said object;
   an image capturing element that receives an optical image of said object illuminated by said light source and outputs color image signals of said object;
   an analog-to-digital converter that converts said color image signals into color image digital signals;
   a plurality of memories that store said color image digital signals, corresponding to said color image signals, outputted by said analog-to-digital converter;
   a video processing circuit that generates a video signal based on said color image digital signals stored in said plurality of memories;
   a brightness data generating circuit that generates brightness data based on said color image digital signals stored in said plurality of memories;
   a histogram circuit that applies histogram processing to said brightness data, generated by said brightness data generating circuit, to output histogram data; and
   a controller that controls an amount of light emitted by said light source in accordance with a result of said histogram processing by said histogram circuit.

2. The electronic endoscope system of claim 1, wherein said controller averages values of said histogram data output by said histogram circuit to obtain an averaged value, said controller controlling said amount of light emitted by said light source in accordance with said averaged value.

3. The electronic endoscope system of claim 2, wherein said controller decreases said amount of light emitted by said light source when said averaged value is greater than a first reference value.

4. The electronic endoscope system of claim 3, wherein said controller increases said amount of light emitted by said light source when said averaged value is less than a second reference value, said second reference value being smaller than said first reference value.

5. The electronic endoscope system of claim 2, wherein said controller controls said amount of light emitted by said light source so that said averaged value is within a predetermined value range.

6. The electronic endoscope system of claim 1, wherein said histogram circuit applies said histogram processing to a part of said brightness data generated by said brightness data generating circuit.

7. The electronic endoscope system of claim 6, wherein said controller averages values of said histogram data output by said histogram circuit to obtain an averaged value, said controller controlling said amount of light emitted by said light source in accordance with said averaged value.

8. The electronic endoscope system of claim 7, wherein said controller decreases said amount of light emitted by said light source when said averaged value is greater than a first reference value.

9. The electronic endoscope system of claim 8, wherein said controller increases said amount of light emitted by said light source when said averaged value is less than a second reference value, said second reference value is smaller than said first reference value.

10. The electronic endoscope system of claim 7, wherein said controller controls said amount of light emitted by said light source so that said averaged value is within a predetermined value range.

11. The electronic endoscope system of claim 6, wherein said video processing circuit is interfaced with a display device that receives said video signal to display an image of said object, said electronic endoscope system further comprising an enlargement processing circuit that enlarges said image displayed on said display device, a part of said image being displayed on said display device when an enlargement processing is applied by said enlargement processing circuit, said histogram circuit applying said histogram processing to only a part of said brightness data corresponding to said part of said image displayed on said display device.

12. The electronic endoscope system according to claim 6, further comprising a data limiting device that limits an amount of data transmitted from said brightness data generating circuit to said histogram circuit, such that a portion of said brightness data is processed by said histogram circuit.

13. The electronic endoscope system of claim 1, wherein said brightness data generating circuit further generates color difference data, said electronic endoscope system further comprising a brightness look up table that outputs processed brightness data based on said brightness data output by said brightness data generating circuit and output data of said histogram circuit, a color restoration circuit generating restored color image data in accordance with said color difference data generated by said brightness data generating circuit and said processed brightness data output from said brightness look up table, said color restored color image data being transmitted to said video processing circuit.

14. An electronic endoscope system for detecting an image of an object using an imaging device, comprising:

means for emitting light to illuminate said object;

means for capturing an optical image of said object illuminated by said emitting means, said capturing means outputting color image signals of said object;

means for converting said color image signals into color image digital signals;

means for storing said color image digital signals, corresponding to said color image signals, outputted by said converting means;

means for producing a video signal based on said color image digital signals stored in said storing means;

means for generating brightness data based on said color image digital signals stored in said storing means;

means for histogram processing said brightness data, generated by said brightness generating means, to output histogram data; and means for controlling an amount of light emitted by said emitting means in accordance with a result of said histogram processing by said histogram processing means.

15. The electronic endoscope system of claim 14, wherein said controlling means averages values of said histogram data output by said histogram processing means to obtain an averaged value, said controlling means controlling said emitting means in accordance with said averaged value.

16. The electronic endoscope system of claim 15, wherein said controlling means decreases an amount of light emitted by said emitting means when said averaged value is greater than a first reference value.

17. The electronic endoscope system of claim 16, wherein said controlling means increases said amount of light emitted by said emitting means when said averaged value is less than a second reference value, said second reference value being smaller than said first reference value.

18. The electronic endoscope system of claim 15, wherein said controlling means increases an amount of light emitted by said emitting means when said averaged value is less than a predetermined reference value.

19. An electronic endoscope system for detecting an image of an object using an imaging device, comprising:

a light source that emits light to illuminate said object;

an image capturing device that receives an optical image of said object illuminated by said light source and outputs color image signals of said object;

a converter that converts said color image signals into color image digital signals;

a memory that stores said color image digital signals, corresponding to said color image signals, outputted by said converter;

a processor that generates a video signal, corresponding to an image, that is outputted to a display unit, said video signal being based on said color image digital signals stored in said memory;

a brightness data generating circuit that generates brightness data based on said color image digital signals stored in said memory;

a histogram circuit that applies histogram processing to said brightness data, generated by said brightness data generating circuit, to output histogram data;

a controller that controls an amount of light emitted by said light source in accordance with a result of said histogram processing by said histogram circuit; and an enlargement processing device that enlarges said image outputted to said display unit, a part of said image being displayed on said display unit when an enlargement processing is applied by said enlargement processing device, said histogram circuit applying said histogram processing to only a part of said brightness data corresponding to said part of said image displayed on said display unit.

20. The electronic endoscope system of claim 19, wherein said controller averages values of said histogram data output by said histogram circuit to obtain an averaged value, said controller controlling said amount of light emitted by said light source in accordance with said averaged value.

21. The electronic endoscope system of claim 1, wherein said light source emits light to sequentially illuminate said object with a plurality of color lights.

22. The electronic endoscope of claim 14, wherein said emitting means emits light to sequentially illuminate said object with a plurality of color lights.

* * * * *